(12) United States Patent
Yang et al.

(10) Patent No.: US 11,340,116 B2
(45) Date of Patent: May 24, 2022

(54) OPTICAL GRADATION SYSTEM AND METHOD (71) Applicant: SHENZHEN LUBANG TECHNOLOGY CO., LTD., Guangdong (CN)

(72) Inventors: Yang Yang, Guangdong (CN); Xinyang Liu, Guangdong (CN); Xiaochun Li, Guangdong (CN); Huihui Huang, Guangdong (CN)

(73) Assignee: SHENZHEN LUBANG TECHNOLOGY CO., LTD., Guangdong (CN)

( * ) Notice: Subject to any disclaimer, the term of this patent is extended or adjusted under 35 U.S.C. 154(b) by 82 days.

(21) Appl. No.: 16/759,849

(22) PCT Filed: Apr. 3, 2020

(86) PCT No.: PCT/CN2020/083190
§ 371 (c)(1),
(2) Date: Apr. 28, 2020

(87) PCT Pub. No.: WO2021/082351
PCT Pub. Date: May 6, 2021

(65) Prior Publication Data
US 2021/0215540 A1   Jul. 15, 2021

(30) Foreign Application Priority Data
Nov. 2, 2019   (CN) .......................... 201911062461.0

(51) Int. Cl.
*G01J 4/02*   (2006.01)
*G02F 1/1335*   (2006.01)
*G01J 4/00*   (2006.01)

(52) U.S. Cl.
CPC .......... *G01J 4/02* (2013.01); *G02F 1/133528* (2013.01); *G01J 2004/002* (2013.01)

(58) Field of Classification Search
CPC ......... G02F 1/133528; G02F 1/133638; G02F 1/13363; G02F 2413/02; G02F 1/13471;
(Continued)

(56) References Cited

U.S. PATENT DOCUMENTS 4,792,850 A * 12/1988 Liptoh ................ G02F 1/13471
                                                348/57
6,447,120 B1   9/2002 Hansen et al.
(Continued)

FOREIGN PATENT DOCUMENTS

| CN | 1509422 A | 6/2004 |
| CN | 1682154 A | 10/2005 |

(Continued)

OTHER PUBLICATIONS

First Office Action dated Jul. 16, 2020 from corresponding Chinese Application No. 201911062461.0; English language translation incuded; 7 pages.

(Continued)

*Primary Examiner* — Michael P Stafira
(74) *Attorney, Agent, or Firm* — Berenato & White, LLC (57) ABSTRACT Disclosed are an optical gradation system and method. The optical gradation system comprises: a first device configured to emit broad-spectrum linearly polarized light in a first polarization direction; a second device provided with at least one first region for splitting lights of different wavelengths mixed in the broad-spectrum linearly polarized light incident by the first device into emergent lights in different polarization directions without changing a beam propagation path; a third device configured to filter out linearly polarized light in a second polarization direction from the emergent lights from the second device in different polarization directions; and, a rotator configured to drive at least one of the first device, the second device and the third device to rotate, (Continued)

wherein the first device, the second device and the third device are arranged coaxially.

18 Claims, 7 Drawing Sheets

(58) Field of Classification Search
CPC .......... G02F 1/1335; G02F 1/0136; G02F 1/133531; G02F 1/133541; G02F 1/133631; G02F 1/1393; G02F 1/133536; G02F 2413/07; G02F 2413/08; G02F 1/133555; G02F 1/141; G02F 1/1313; G02F 1/13362; G02F 1/134363; G02F 2413/03; G02F 1/133514; G02F 1/133553; G02F 1/133565; G02F 2413/04; G02F 1/13473; G02F 2203/07; G02F 1/093; G02F 1/133633; G02F 1/1347; G02F 1/133502; G02F 1/133548; G02F 1/133634; G02F 1/1396; G02F 2203/04; G02F 2413/01; G02F 2413/05; G02F 1/133509; G02F 1/133617; G02F 1/13718; G02F 2203/62; G02F 1/1323; G02F 1/13478; G02F 2201/50; G02F 2203/02; G02F 1/133357; G02F 1/133538; G02F 1/13394; G02F 1/29; G02F 2201/44; G02F 2203/12; G02F 1/133543; G02F 1/1337; G02F 1/13439; G02F 1/137; G02F 1/13725; G02F 1/1418; G02F 1/23; G02F 1/13306; G02F 1/133345; G02F 1/133711; G02F 1/133726; G02F 1/1395; G02F 2201/34; G02F 2202/30; G02F 2202/40; G02F 2202/42; G02F 2203/055; G02F 1/13; G02F 1/133; G02F 1/133334; G02F 1/133607; G02F 1/13475; G02F 1/1368; G02F 1/1516; G02F 1/1523; G02F 1/157; G02F 1/163; G02F 2201/123; G02F 2201/343; G02F 2201/58; G02F 2203/09; G02F 2413/06; G02F 2413/12; G02F 1/0322; G02F 1/13318; G02F 1/133504; G02F 1/133526; G02F 1/133533; G02F 1/1336; G02F 1/133636; G02F 1/133753; G02F 1/13392; G02F 1/134309; G02F 1/135; G02F 1/1351; G02F 1/136213; G02F 1/13624; G02F 1/3526; G02F 2201/121; G02F 2201/307; G02F 2201/346; G02F 2202/043; G02F 2203/11; G02F 2203/30; G02F 2203/48; G02F 1/055; G02F 1/1333; G02F 1/133382; G02F 1/13342; G02F 1/133512; G02F 1/133521; G02F 1/13355; G02F 1/133567; G02F 1/133602; G02F 1/133603; G02F 1/133605; G02F 1/133606; G02F 1/13398; G02F 1/1341; G02F 1/1362; G02F 1/13787; G02F 1/13793; G02F 1/1392; G02F 1/294; G02F 2/00; G02F 2203/21; G02F 2413/13; G02F 2413/14; G02F 1/0027; G02F 1/03; G02F 1/0311; G02F 1/0551; G02F 1/09; G02F 1/091; G02F 1/13312; G02F 1/133308; G02F 1/13338; G02F 1/133562; G02F 1/133615; G02F 1/133632; G02F 1/133723; G02F 1/133738; G02F 1/133742; G02F 1/133784; G02F 1/133788; G02F 1/1339; G02F 1/134372; G02F 1/13476; G02F 1/1358; G02F 1/136222; G02F 1/136277; G02F 1/21; G02F 1/291; G02F 2201/16; G02F 2201/52; G02F 1/31; G02F 1/37; G02F 2202/28; G02F 1/136286; G02F 1/133707; G02F 1/292; G02F 1/353; G02F 1/133371; G02F 1/39; G02F 1/136227; G02F 1/133305; G02F 1/1334; G02F 2203/06; G02F 1/1354; G02F 1/13551; G02F 1/133621; G02F 1/3534; G02F 1/1343; G02F 2203/50; G02F 1/134336; G02F 1/133637; G02F 1/1326; G02F 1/133616; G02F 1/3501; G02F 1/134345; G02F 1/33; G02F 1/1303; G02F 1/212; G02F 2203/01; G02F 2203/18; G02F 1/225; G02F 2201/305; G02F 1/11; G02F 1/3507; G02F 2203/05; G02F 2202/36; G02F 1/0327; G02F 1/0147; G02F 2203/24; G02F 1/365; G02F 2201/38; G02F 1/133757; G02F 1/167; G02F 1/13452; G02F 1/136209; G02F 2201/17; G02F 1/035; G02F 1/3558; G02F 1/3503; G02F 1/3532; G02F 1/0126; G02F 1/133524; G02F 1/1309; G02F 1/35; G02F 1/3544; G02F 2203/13; G02F 2202/022; G02F 1/0955; G02F 1/133545; G02F 2202/32; G02F 2203/28; G02F 1/133614; G02F 1/133622; G02F 1/136; G02F 1/13712; G02F 1/3542; G02F 1/13775; G02F 1/133507; G02F 1/139; G02F 1/0134; G02F 1/3528; G02F 1/133626; G02F 1/134381; G02F 2413/10; G02F 1/1345; G02F 1/313; G02F 1/01; G02F 3/00; G02F 1/133388; G02F 1/133635; G02F 2202/10; G02F 2201/122; G02F 1/3775; G02F 2203/34; G02F 1/0316; G02F 1/133365; G02F 2203/585; G02F 1/134318; G02F 2202/20; G02F 1/3536; G02F 1/133302; G02F 1/133331; G02F 1/13454; G02F 1/1397; G02F 2201/30; G02F 2202/22; G02F 1/0121; G02F 1/3136; G02F 2203/64; G02F 1/0115; G02F 1/0305; G02F 1/133516; G02F 1/395; G02F 2202/023; G02F 1/133611; G02F 1/1398; G02F 1/2955; G02F 2413/15; G02F 1/133342; G02F 2201/124; G02F 1/13378; G02F 2413/105; G02F 1/133557; G02F 2/02; G02F 2201/40; G02F 1/011; G02F 1/1391; G02F 2203/60; G02F 1/133385; G02F 1/392; G02F 1/132; G02F 2201/02; G02F 2203/15; G02F 1/13345; G02F 1/133776; G02F 1/3515; G02F 1/3548; G02F 1/136204; G02F 1/3505; G02F 1/3538; G02F 1/0139; G02F 1/3132; G02F 1/293; G02F 1/3553; G02F 1/00; G02F 1/0353; G02F 2203/22; G02F 1/0131; G02F 1/13685; G02F 1/0102; G02F 1/3519; G02F 1/125; G02F 1/2255; G02F 2203/26; G02F 1/133362; G02F 1/133377; G02F 1/133618; G02F 1/133623; G02F 1/13706; G02F 1/3137; G02F 1/332; G02F 1/216; G02F 1/3511;

G02F 1/13324; G02F 1/13336; G02F 1/155; G02F 1/3513; G02F 1/3546; G02F 1/3523; G02F 2203/03; G02F 1/3517; G02F 1/095; G02F 1/133354; G02F 1/133519; G02F 2/004; G02F 2202/101; G02F 2201/54; G02F 2203/58; G02F 1/1332; G02F 1/133608; G02F 1/153; G02F 1/133761; G02F 1/136295; G02F 1/377; G02F 1/133604; G02F 1/2252; G02F 1/295; G02F 1/116; G02F 1/13356; G02F 2/002; G02F 2203/66; G02F 1/0036; G02F 1/355; G02F 1/311; G02F 2203/56; G02F 1/3556; G02F 1/05; G02F 2202/046; G02F 1/13606; G02F 1/13731; G02F 1/19; G02F 2201/08; G02F 2202/07; G02F 2203/10; G02F 2203/20; G02F 1/0123; G02F 2201/18; G02F 1/025; G02F 1/133749; G02F 1/213; G02F 1/2257; G02F 2201/20; G02F 2203/69; G02F 1/0338; G02F 1/065; G02F 1/315; G02F 1/133627; G02F 1/1533; G02F 1/133351; G02F 1/133769; G02F 2201/12; G02F 1/0045; G02F 1/3131; G02F 1/015; G02F 1/133601; G02F 1/13756; G02F 1/211; G02F 2203/54; G02F 1/0063; G02F 1/133719; G02F 2201/36; G02F 2202/104; G02F 1/133311; G02F 1/136218; G02F 1/13737; G02F 1/3509; G02F 2201/086; G02F 1/0018; G02F 1/133703; G02F 1/13373; G02F 1/061; G02F 1/113; G02F 1/133609; G02F 1/136236; G02F 1/15; G02F 1/0142; G02F 1/133773; G02F 1/13458; G02F 1/133746; G02F 1/172; G02F 2201/56; G02F 2203/17; G02F 1/0356; G02F 1/215; G02F 1/361; G02F 2203/023; G02F 1/0128; G02F 1/017; G02F 1/07; G02F 1/092; G02F 2201/1536; G02F 2202/16; G02F 1/0009; G02F 1/01716; G02F 1/133368; G02F 1/1414; G02F 2202/04; G02F 1/0072; G02F 1/0144; G02F 1/0555; G02F 1/133317; G02F 1/13613; G02F 1/1365; G02F 1/374; G02F 2201/503; G02F 1/133624; G02F 1/134354; G02F 1/136231; G02F 1/3615; G02F 2/006; G02F 1/13347; G02F 1/133715; G02F 1/1503; G02F 1/335; G02F 2201/508; G02F 3/026; G02F 1/133314; G02F 1/13525; G02F 1/3612; G02F 1/372; G02F 2201/066; G02F 3/02; G02F 1/133613; G02F 1/13415; G02F 1/136281; G02F 1/13781; G02F 2201/128; G01J 4/04; G01J 3/0224; G01J 4/00; G01J 3/10; G01J 3/02; G01J 3/0208; G01J 3/447; G01J 3/44; G01J 9/02; G01J 3/42; G01J 9/00; G01J 3/0218; G01J 3/2823; G01J 3/18; G01J 3/0205; G01J 3/0229; G01J 11/00; G01J 3/021; G01J 3/2803; G01J 3/26; G01J 3/45; G01J 3/4406; G01J 3/0256; G01J 1/4257; G01J 3/28; G01J 9/04; G01J 3/12; G01J 1/0429; G01J 2209/0261; G01J 3/36; G01J 3/453; G01J 3/0237; G01J 3/0216; G01J 2004/001; G01J 3/4412; G01J 3/14; G01J 3/433; G01J 1/44; G01J 1/42; G01J 3/4531; G01J 9/0215; G01J 3/027; G01J 3/06; G01J 2203/2826; G01J 5/20; G01J 3/51; G01J 1/4228; G01J 9/0246; G01J 3/50; G01J 3/32; G01J 1/0414; G01J 3/0291; G01J 3/0297; G01J 3/4338; G01J 1/04; G01J 4/02; G01J 3/0264; G01J 1/0411; G01J 3/0243; G01J 1/0437; G01J 3/4535; G01J 3/508; G01J 1/0407; G01J 2003/1213; G01J 2005/0077; G01J 3/0286; G01J 3/513; G01J 3/0289; G01J 3/1804; G01J 3/501; G01J 2003/2806; G01J 3/0272; G01J 3/108; G01J 5/59; G01J 2004/005; G01J 2001/4242; G01J 2003/1282; G01J 3/462; G01J 2003/064; G01J 5/02; G01J 3/2889; G01J 5/08; G01J 2009/002; G01J 3/443; G01J 3/0202; G01J 3/0232; G01J 3/00; G01J 3/0259; G01J 1/4204; G01J 2003/2866; G01J 2009/0265; G01J 1/0418; G01J 1/429; G01J 5/10; G01J 3/1256; G01J 2003/1291; G01J 3/0262; G01J 5/023; G01J 5/0806; G01J 1/00; G01J 1/08; G01J 1/26; G01J 3/0227; G01J 3/465; G01J 2005/583; G01J 3/08; G01J 2003/102; G01J 3/1895; G01J 5/58; G01J 3/4532; G01J 2003/106; G01J 3/4537; G01J 5/045; G01J 1/02; G01J 3/0235; G01J 3/0294; G01J 2003/282; G01J 2004/002; G01J 5/024; G01J 1/0425; G01J 1/0488; G01J 2003/1269; G01J 2009/0223; G01J 2009/0226; G01J 5/38; G01J 1/22; G01J 2001/446; G01J 5/06; G01J 5/0803; G01J 5/0853; G01J 1/0403; G01J 2003/425; G01J 3/463; G01J 5/0802; G01J 2001/4238; G01J 3/2846; G01J 5/40; G01J 2001/442; G01J 3/0213; G01J 3/0221; G01J 3/04; G01J 3/427; G01J 5/602; G01J 1/0214; G01J 2003/062; G01J 2003/1217; G01J 2003/1828; G01J 2003/423; G01J 2009/0276; G01J 5/0003; G01J 5/0896; G01J 1/0233; G01J 2003/1243; G01J 2003/451; G01J 2009/0249; G01J 5/0831; G01J 2009/0219; G01J 3/457; G01J 5/00; G01J 2001/4247; G01J 2003/069; G01J 2003/1226; G01J 2003/1286; G01J 2004/004; G01J 3/0248; G01J 3/0278; G01J 5/0235; G01J 5/04; G01J 5/0875

See application file for complete search history.

(56) References Cited

U.S. PATENT DOCUMENTS

| | | | |
|---|---|---|---|
| 6,666,556 | B2 | 12/2003 | Hansen et al. |
| 7,903,530 | B2 | 3/2011 | Kim |
| 9,494,821 | B2 | 11/2016 | Choi et al. |
| 2011/0134520 | A1* | 6/2011 | Goruganthu ....... G02B 21/0016 359/386 |
| 2019/0004406 | A1* | 1/2019 | Fuchikami ........... H04N 7/0127 |

FOREIGN PATENT DOCUMENTS

| | | |
|---|---|---|
| CN | 1734340 A | 2/2006 |
| CN | 101216608 A | 7/2008 |
| CN | 103038806 A | 4/2013 |
| CN | 206074977 U * | 4/2017 |

(56) References Cited

FOREIGN PATENT DOCUMENTS

| | | | | |
|---|---|---|---|---|
| CN | 110764269 A | | 2/2020 | |
| CN | 111094066 A | * | 5/2020 | ............... B60Q 1/24 |
| JP | H10123463 A | | 5/1998 | |
| JP | 2001201793 A | | 7/2001 | |
| JP | 2003161897 A | * | 6/2003 | ........... H04N 9/3117 |
| JP | 2006145644 A | | 6/2006 | |
| JP | 2007243928 A | * | 9/2007 | |
| KR | 20120133668 A | * | 12/2012 | |
| WO | WO2013002597 A2 | | 1/2013 | |

OTHER PUBLICATIONS

International Search Report dated Jul. 21, 2020 from corresponding International Application No. PCT/CN2020/083190; English language translation incuded; 5 pages.

Written Opinion dated Jul. 27, 2020 from corresponding International Application No. PCT/CN2020/083190; English language translation incuded; 7 pages.

* cited by examiner

Fig.8 emitting, by a first device to a second device provided with at least one first region, broad-spectrum linearly polarized light in a first polarization direction splitting, by the first region of the second device without changing a beam propagation path, lights of different wavelengths mixed in the incident broad-spectrum linearly polarized light into emergent lights in different polarization directions filtering out, by a third device, linearly polarized light in a second polarization direction from the emergent lights from the second device in different polarization directions driving, by at least one rotator, at least one of the first device, the second device and the third device arranged coaxially to rotate

Fig.9

OPTICAL GRADATION SYSTEM AND METHOD

CROSS-REFERENCE TO RELATED APPLICATIONS

The present application claims priority to Chinese Patent Application No. 201911062461.0 filed on Nov. 2, 2019 and entitled "OPTICAL GRADATION SYSTEM AND METHOD", the content of which is incorporated herein by reference in its entirety.

TECHNICAL FIELD

The present disclosure relates to the technical field of optics, and in particular to an optical gradation system and method.

BACKGROUND

Advertising projection lamps can project various patterns, and are mainly used in various entertainment venues such as bars, disco bars, cafes and KTVs. They may also be commercially used for directional lighting, for example, in clothing stores, convenience stores, supermarkets and exclusive shops. They can display various light spots and company LOGOs to create lighting effects, and can be used in exhibitions to highlight advertised products or company image.

An advertising projection lamp is generally composed of four parts, i.e., a light source, a lens group, a slide and a lens group which are arranged successively along a light transmission direction. The slide is also called a pattern sheet for imaging, so the quality of the pattern sheet directly influences the projection effect. Therefore, if the advertising projection lamp needs to change patterns, different pattern sheets are to be replaced.

By customizing the slides, white lights transmitting through the slides are presented as colored patterns. The operation is roughly as follows: a light beam from a light source is collimated and then directly projected onto the slide that serves as a filter. A desired pattern is fabricated by customization, and lights of different colors transmit through different parts of the pattern to form a colored pattern. However, it is disadvantageous that the colors of the pattern are fixed and unchangeable.

SUMMARY

An objective of the present disclosure is to provide an optical gradation system and method to enrich the colors for variation.

For this purpose, the present disclosure provides an optical gradation system, including:

a first device configured to emit broad-spectrum linearly polarized light in a first polarization direction;

a second device provided with at least one first region for splitting lights of different wavelengths mixed in the broad-spectrum linearly polarized light incident by the first device into emergent lights in different polarization directions without changing a beam propagation path;

a third device configured to filter out linearly polarized light in a second polarization direction from the emergent lights from the second device in different polarization directions; and a rotator configured to drive at least one of the first device, the second device and the third device to rotate;

wherein the first device, the second device and the third device are arranged coaxially.

The present disclosure further provides an optical gradation method in correspondence to the system, including steps of:

emitting, by a first device to a second device provided with at least one first region, broad-spectrum linearly polarized light in a first polarization direction;

splitting, by the first region of the second device without changing a beam propagation path, lights of different wavelengths mixed in the incident broad-spectrum linearly polarized light into emergent lights in different polarization directions;

filtering out, by a third device, linearly polarized light in a second polarization direction from the emergent lights from the second device in different polarization directions; and driving, by at least one rotator, at least one of the first device, the second device and the third device arranged coaxially to rotate.

The present disclosure has the following beneficial effects.

Relative angles among the first device, the second device and the third device are changed by rotation, so that a wavelength component with the maximum transmittance in the mixed light transmitting through the third device is changed, thereby achieving the color gradation or shading effect. The preset disclosure can be widely applied to advertising projection lamps with rotating patterns, for example, those mounted on door heads, floors and walls.

The present disclosure will be further described below in detail with reference to the accompanying drawings.

BRIEF DESCRIPTION OF THE DRAWINGS

The accompanying drawings constituting a part of the present application are used for providing further understanding of the present disclosure. Illustrative embodiments of the present disclosure and description thereof are used for explaining the present disclosure, rather than constituting any inappropriate limitations to the present disclosure. In the drawings.

DETAILED DESCRIPTION

Specific embodiments of the present disclosure will be described in detail in this section, and the preferred embodiments of the present disclosure are shown in the accompanying drawings. The accompanying drawings are used for supplementing the written description in a graphic manner so that each technical feature and the overall technical solution of the present disclosure can be understood intuitively and visually. However, it should not be regarded as limiting the protection scope of the present disclosure.

In the description of the present disclosure, it should be understood that, in the description related to orientation, the orientation or position relation indicated by terms "upper", "lower", "front", "rear", "left", "right" or the like is an orientation or position relation shown by the accompanying drawings, merely for describing the present disclosure and simplifying the description rather than indicating or implying that the specified device or element must have a particular orientation or be constructed and operated in a particular orientation. Therefore, it should not be interpreted as limitations to the present invention.

In the description of the present disclosure, the terms "first", "second", "third" or the like are merely for distinguishing the technical features, rather than indicating or implying relative importance or implicitly indicating the number of the involved technical features or the precedence relationship between the involved technical features.

In the description of the present disclosure, unless otherwise explicitly defined, the terms "arrange", "mount", "connect" or the like shall be interpreted in a broad sense. The specific meanings of these terms in the present disclosure can be rationally determined in combination with the specific contents of the technical solutions by those skilled in the art.

Figure 1:
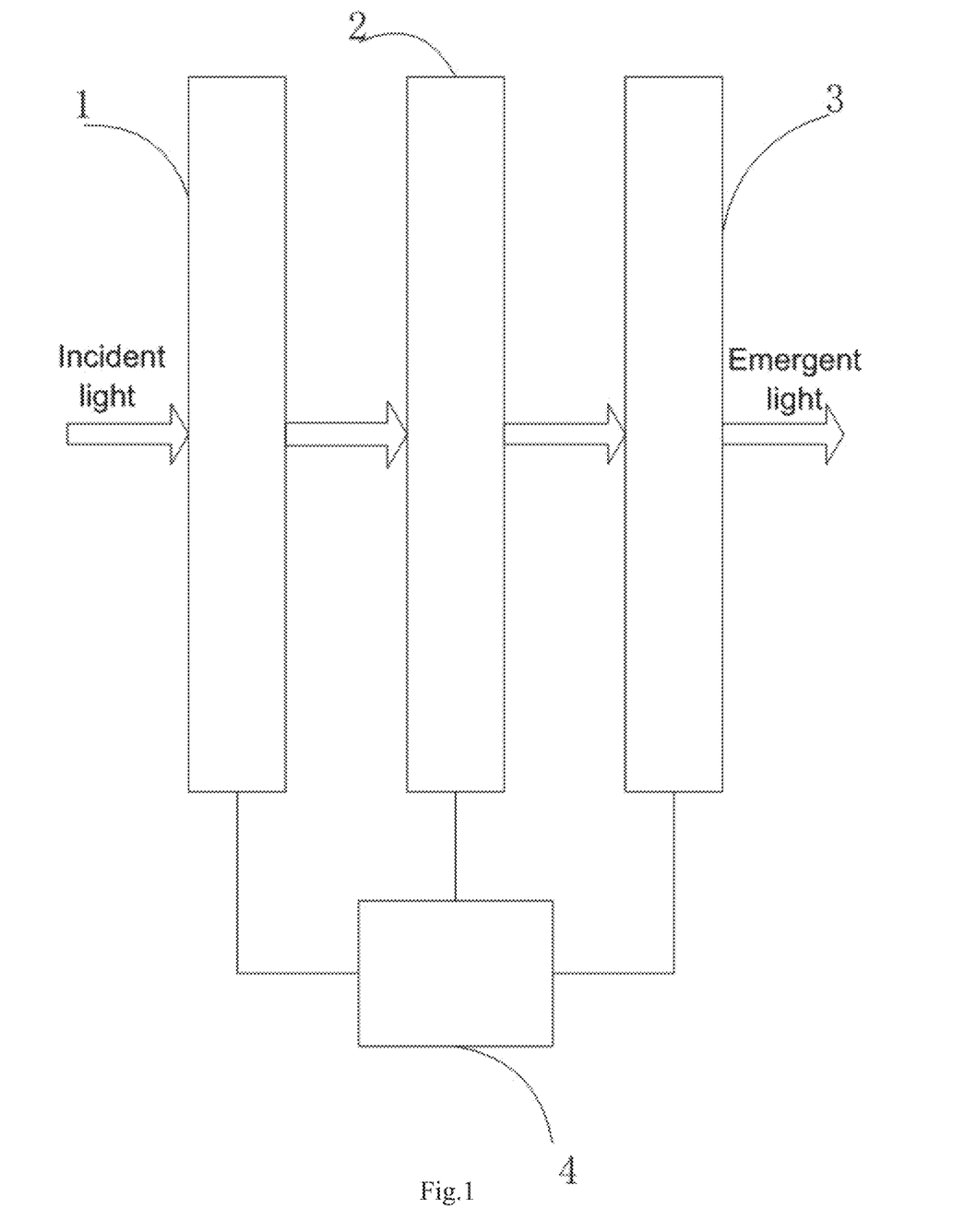
FIG. 1 is a schematic diagram of a partial optical path of an optical gradation system according to an embodiment of the present disclosure.

In accordance with one aspect of the present disclosure, an optical gradation system is provided, as shown in FIG. 1, including a first device 1, a second device 2 and a third device 3 which are arranged coaxially, and at least one rotator 4 used for driving at least one of the first device, the second device and the third device to rotate. It should be understood that, the rotator 4 shown herein may be one rotator, or multiple separate rotators, each of which separately controls the first device, the second device or the third device.

In some embodiments, the first device 1 is configured to emit, to the second device 2, broad-spectrum linearly polarized light in a first polarization direction. In some embodiments, the first device 1 may be a polarizer for performing linear polarization on an external broad-spectrum light source or a broad-spectrum linearly polarized light source, wherein the broad-spectrum light source includes, but not limited to, a white light source. Methods for generating linearly polarized light are exemplarily provided as follows.

1. The polarized light is generated by reflection and refraction, for example, by a polarizing beam splitter or a Nicol prism.

2. The linearly polarized light is generated by dichroism, for example, by an artificial polaroid.

3. The linearly polarized light is generated by a birefringent crystal, for example, a Glan-Foucault prism.

In some embodiments, the second device 2 is provided with at least one first region configured to split lights of different wavelengths mixed in the broad-spectrum linearly polarized light into emergent lights in different polarization directions without changing a beam propagation path. In some embodiments, the second device 2 is a wave plate.

In some embodiments, the third device 3 is configured to filter out linearly polarized light in a second polarization direction form the emergent lights from the second device in different polarization directions. In some embodiments, the third device 3 may be specifically a linear polarizer.

Figure 2:
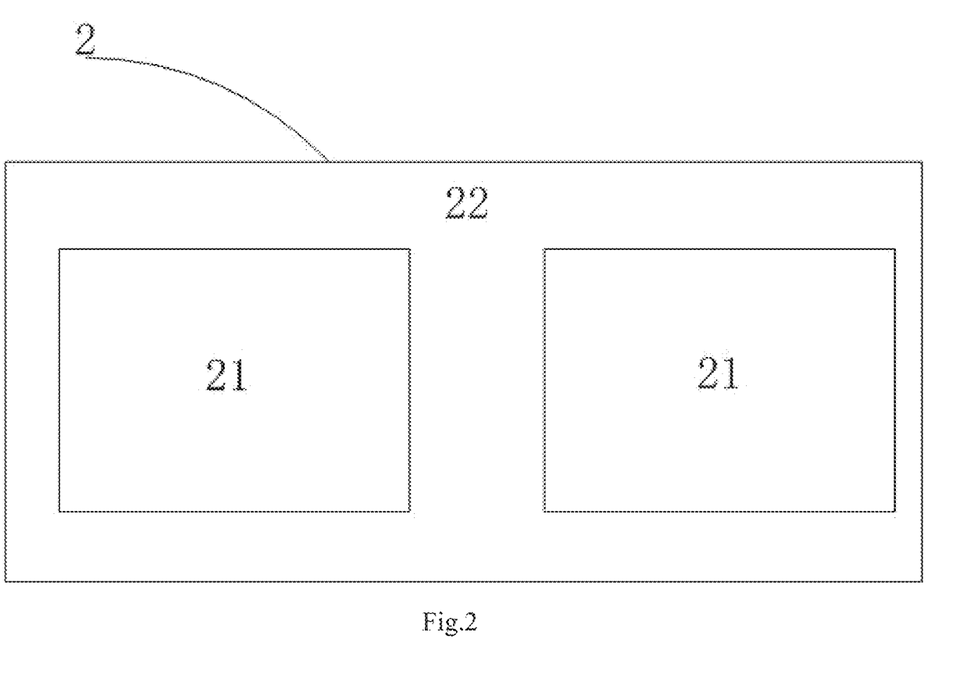
FIG. 2 is a block diagram of an exemplary wave plate according to an embodiment of the present disclosure.

When the optical gradation system of this embodiment is applied for LOGO projection, as shown in FIG. 2, which is a block diagram of an exemplary wave plate according to an embodiment of the present disclosure, the second device 2 may be further provided with a second region 22 that is not orientated and configured to transmit background light of the projection background (the region that is not orientated is configured to realize an ordinary diaphragm function). The first region 21 (two first regions are shown, but the present disclosure is not limited thereto, and other numbers and shapes of first regions are also possible) is configured to set the projected content such as characters and/or patterns. It should be understood that FIG. 2 merely shows an example of the present disclosure, and wave plates of different shapes and sizes may also be provided.

Figure 3:
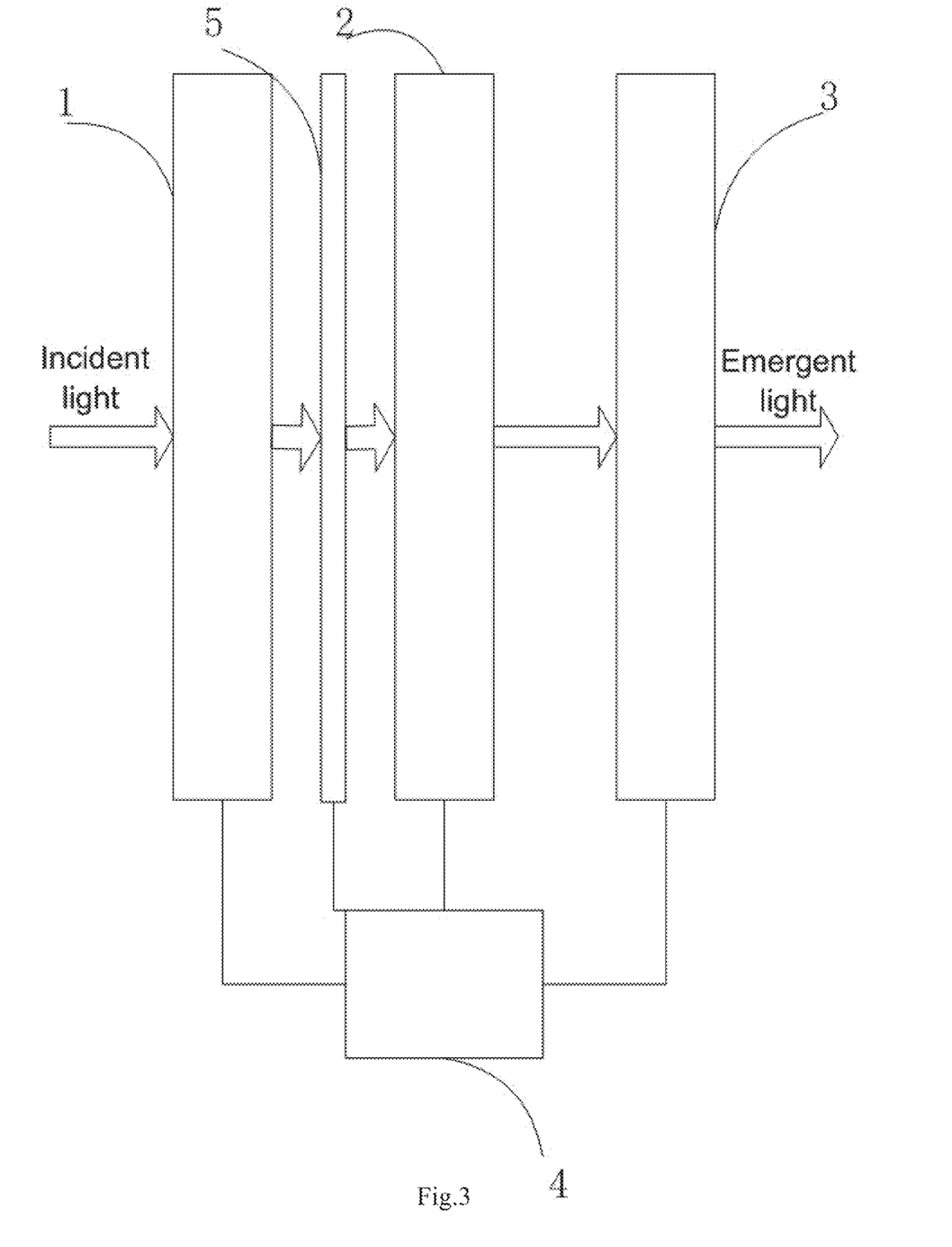
FIG. 3 is a schematic diagram of a partial optical path of the optical gradation system according to another embodiment of the present disclosure.

In an embodiment, with reference to FIG. 3, the system of the present disclosure optionally includes a mask 5 arranged between the first device 1 and the second device 2, and the mask 5 include a light transmitting portion and a non-light-transmitting portion, to realize the setting of the projected content. It should be understood that, although FIG. 3 shows that the mask 5 is arranged between the first device 1 and the second device 2, the present disclosure is not limited thereto, and the mask 5 may also be arranged between the second device 2 and the third device 3. During the specific deployment process, it is possible to arrange a collimator between the broad-spectrum light source and the first device to collimate divergent lights emitted by the broad-spectrum light source. Correspondingly, a lens group for diverging the collimated emergent lights may be further arranged between the third device 3 and the projected object.

During the preparation of the wave plate, an orientation layer determines the internal arrangement structure of the liquid crystal layer. In this embodiment, the first region may be orientated by exposing a photosensitive material sensitive to linear polarization, while an unexposed region corresponds to the second region mentioned above. Additionally, in this embodiment, when in use, different color gradation effects will be generated by the emergent light beam due to varying thicknesses of the wave plate. For example, the gradation between red and green will be produced by a thickness x, the gradation between blue and yellow will be produced by a thickness y, and the gradation between red and yellow will be produced by a thickness z. Also, for liquid crystal layers having the same thickness, in the first region with the same fast-axis orientation, different phase delays will be produced according to different wavelengths of incident lights, so that the lights of different wavelengths mixed in broad-spectrum linearly polarized light such as white light produce different changes in polarization direction in this embodiment. Further, there are at least two first regions in the wave plate, and the at least two first regions correspond to different fast-axis orientations, respectively. Thus, for liquid crystal layers having the same thickness, in two first regions with different fast-axis orientations, two parallel incident light beams of the same wavelength will also produce different phase delays, resulting in different changes in polarization direction. Thus, when relative angles among the first device 1, the second device 2 and the third device 3 are changed by rotation, different gradation states of the same pair of colors are formed in two regions with different fast-axis orientations. For example, on a wave plate having a thickness of x, the final projected pattern is turning red in a first region with a fast-axis orientation of α, and the final projected pattern is turning green in a first region with a fast-axis orientation of β, so that the interestingness and aesthetics of color gradation are further improved.

The relative angles among the first device, the second device and the third device are changed by rotation, so that a wavelength component with the maximum transmittance in the mixed light transmitting through the third device is changed, thereby achieving a color gradation effect. The system can be widely applied to advertising projection lamps with rotating patterns, for example, those mounted on door heads, floors and walls.

In some embodiments, the fast-axis orientation angle in the first region may be set according to a preset pattern indicated by different gray scale values. In the preset pattern, the fast-axis orientation angle corresponding to a pixel point having the maximum gray scale value and the fast-axis orientation angle corresponding to a pixel point having the minimum gray scale value may be set to be perpendicular to each other, for example, 0° and 90° respectively. Additionally, according to the application scenario and the desired display effect, the fast-axis orientation angle in the first region may be set to be directly proportional to the gray scale value in the preset pattern. Alternatively, the first region may include multiple portions in which fast-axis orientation angles are the same and arranged randomly. The application of the present disclosure will be further described below in different display scenarios.

Figure 4:
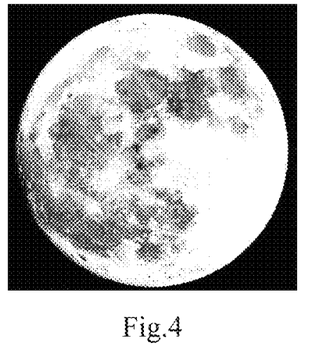
FIG. 4 is a moon-like grayscale image of a second device according to an embodiment of the present disclosure.

With reference to FIG. 4, an embodiment of the present disclosure provides a moon-like grayscale image of the second device 2, wherein different gray scale values represent different fast-axis orientation angles, the fast-axis orientation angle is directly proportional to the gray scale value, and the fast-axis orientation angle of the pixel point having the maximum gray scale value and the fast-axis orientation angle of the pixel point having the minimum gray scale value are perpendicular to each other, for example, 0° and 90° respectively. Furthermore, a mask 5 is arranged between the first device 1 and the second device 2 or between the third device 3 and the second device 2. A pure black part in FIG. 4 is blocked by the mask 5. In this embodiment, the second device 2 and the mask 5 may be set to be the same in movement speed. In some embodiments, the mask 5 is a separate glass plate which is provided with a corresponding non-light-transmitting portion for blocking the pure black part in FIG. 4.

By designing the second device 2 (e.g., a wave plate) as a planet pattern and blocking a partial region by the mask 5, an unblocked part of a projected planet pattern will change in brightness when the second device 2 and the first device 1 or the third device 3 are rotated relative to each other, thus achieving an effect of simulating real planet revolution.

Additionally, it should be understood that, although the planet pattern is shown as moon in FIG. 4, the application of the present disclosure is not limited thereto, and the technical solutions of the present disclosure are also applicable to the dynamic display of other planets (e.g., earth).

Figure 5:
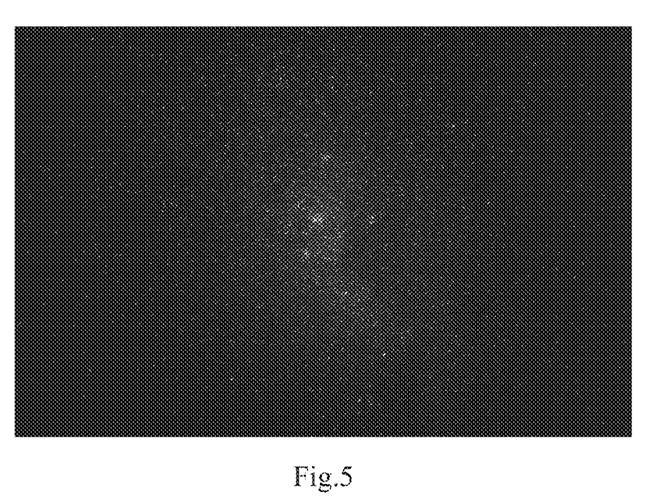
FIG. 5 is a starry grayscale image of the second device according to an embodiment of the present disclosure.

With reference to FIG. 5, an embodiment of the present disclosure provides a starry grayscale image of the second device 2, wherein the fast-axis orientation angle is not directly related to the gray scale value; the fast-axis orientation angle is arranged randomly, but the fast-axis orientation angle of a single star is the same; and the fast-axis orientation angle of the pixel point having the maximum gray scale value and the fast-axis orientation angle of the pixel point having the minimum gray scale value are perpendicular to each other, for example, 0° and 90° respectively. Furthermore, a mask 5 is arranged between the first device 1 and the second device 2 or between the third device 3 and the second device 2. The pure black part in FIG. 4 is blocked by the mask 5. In this embodiment, the second device and the mask 5 may be set to be the same in movement speed. In some embodiments, the mask 5 is a separate glass plate which is provided with a corresponding non-light-transmitting portion for blocking the pure black part in FIG. 5.

By designing the second device 2 (e.g., a wave plate) as a starry pattern and blocking a partial region by the mask 5, an unblocked part of a projected starry pattern will change in brightness when the second device 2 and the first device 1 or the third device 3 are rotated relative to each other. Since the fast axis of a single star is orientated randomly, the time for alternating dark and bright changes varies among different stars during rotation, thus achieving the star twinkling effect and simulating the real star revolution.

Additionally, it should be understood that, the starry pattern in FIG. 5 is merely an example of the present disclosure, and the technical solutions of the present disclosure are also applicable to the dynamic display of other starry patterns.

Figure 6A:
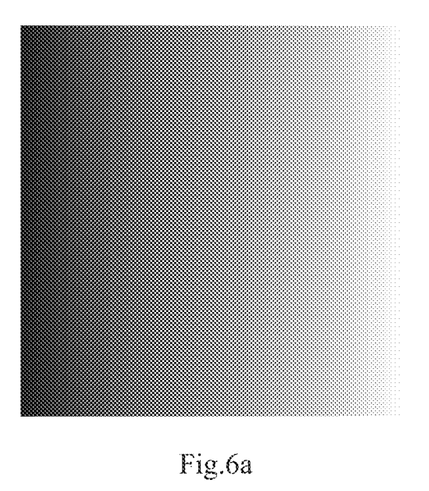
FIGS. 6a-6b are stripy grayscale images of the second device according to an embodiment of the present disclosure.
Figure 6B:
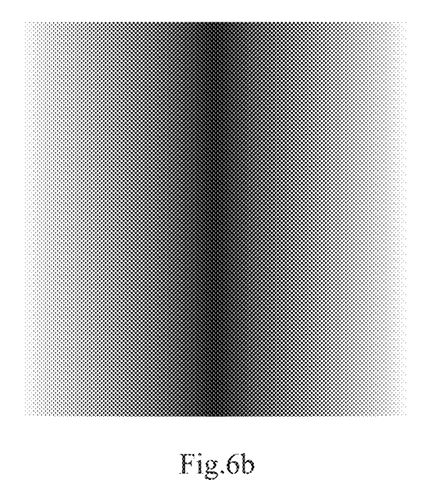
Figure 7:
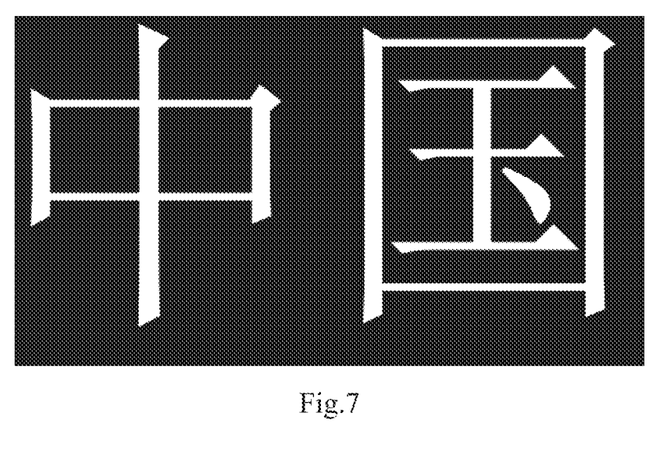
FIG. 7 is a schematic diagram of a mask pattern according to an embodiment of the present disclosure.

With reference to FIGS. 6a-6b and FIG. 7, stripy grayscale images of the second device 2 and an exemplary mask pattern according to an embodiment of the present disclosure are shown, respectively. In FIGS. 6a-6b, different gray scales represent different fast-axis orientation angles; the fast-axis orientation angle is directly proportional to the gray scale value; and the fast-axis orientation angle of the pixel point having the maximum gray scale value and the fast-axis orientation angle of the pixel point having the minimum gray scale value are perpendicular to each other, for example, 0° and 90° respectively. Furthermore, a mask 5 is arranged between the first device 1 and the second device 2 or between the third device 3 and the second device 2. The mask 5 may have a pattern as shown in FIG. 7, wherein a black part is non-light-transmitting, while a white part is light transmitting. The second device 2 and the mask 5 move independently. For example, when the second device 2 is rotated, the mask 5 is kept unmoved. In some embodiments, the mask 5 is a separate glass plate.

By designing the second device 2 (e.g., a wave plate) as a stripy pattern and blocking a partial region by the mask 5, an unblocked part of a projected pattern will change in brightness when the second device 2 and the first device 1 or the third device 3 are rotated relative to each other. When the wave plate adopts the structure shown in FIG. 6a, the transmitted pattern changes in brightness alternately from left to right; and, when the wave plate adopts the structure shown in FIG. 6b, the transmitted pattern changes in brightness alternately from middle to two sides.

Additionally, it should be understood that, the stripy pattern shown in FIGS. 6a-6b is merely an example of the present disclosure, and other stripy patterns (e.g., a stripy pattern that gradually changes in the vertical direction) are also possible in the present disclosure. Additionally, the mask pattern shown in FIG. 7 is merely an example of the present disclosure, and other mask patterns (e.g., other characters, digits, graphs, etc.) are also possible in the present disclosure.

Figure 8:
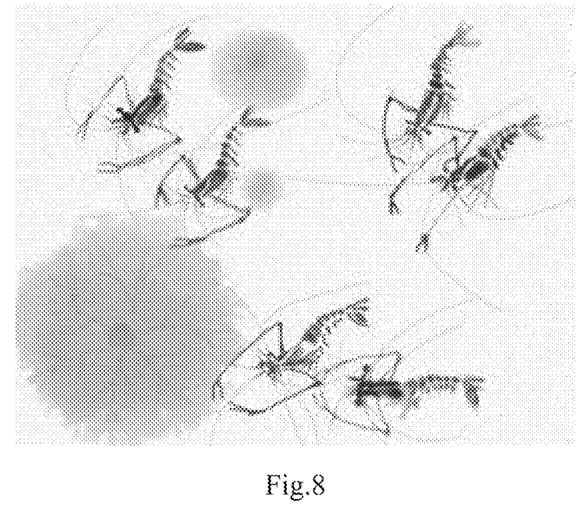
FIG. 8 is a schematic diagram of a mask pattern according to another embodiment of the present disclosure.

With reference to FIG. 8, an embodiment of the present disclosure provides a mask with a landscape ink painting pattern. In this figure, a part corresponding to a shrimp is light transmitting. By designing an appropriate fast-axis orientation on the second device 2 (e.g., a wave plate), the fast-axis orientation of the same shrimp is the same, and fast-axis orientations of different shrimps are different. The second device 2 and the mask 5 are the same in movement speed. In some embodiments, the mask 5 is a separate glass plate.

When relative rotation occurs between the second device 2 and the first device 1 or the third device 3, brightness changes in the transmitted pattern, i.e., among the shrimps, achieving the effect of moving landscape painting.

Figure 9:
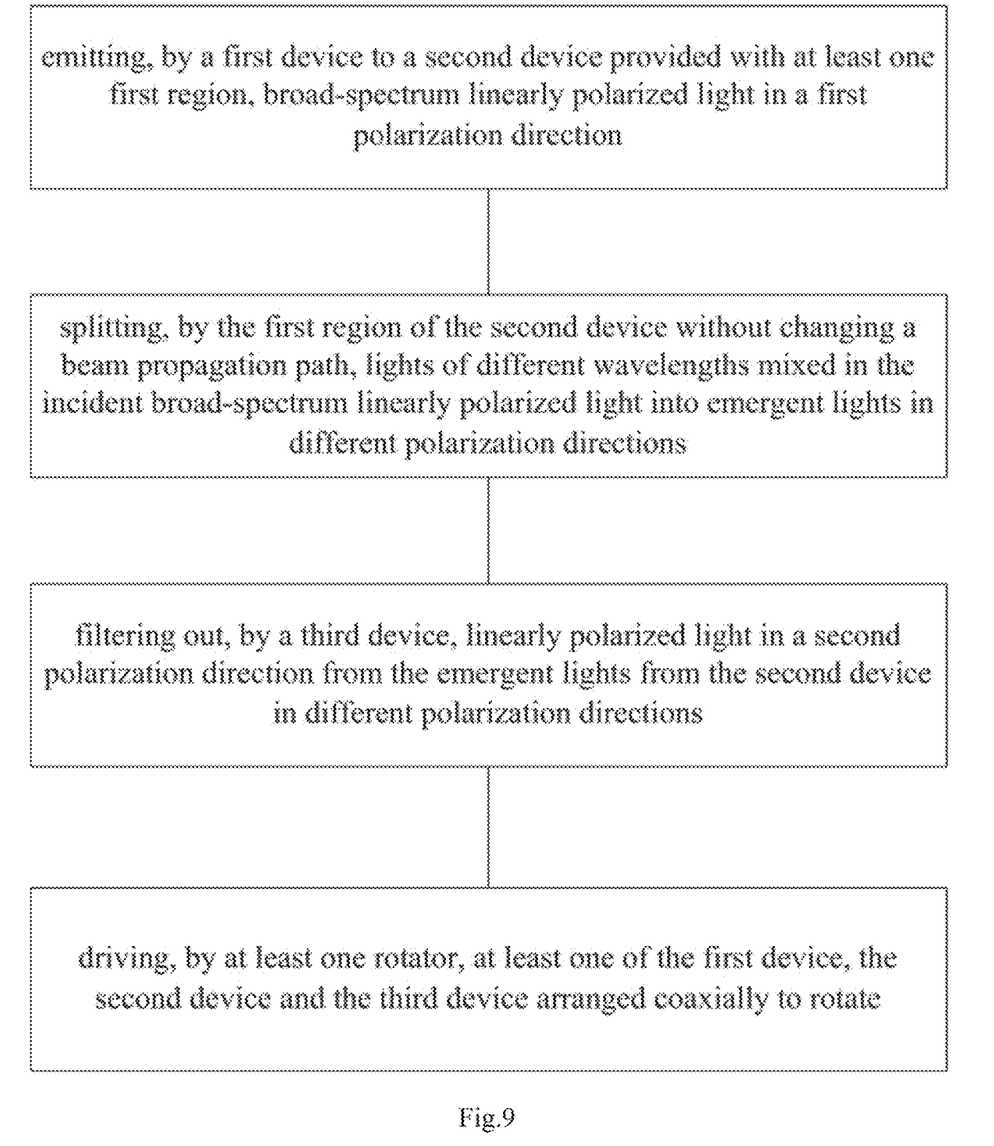
FIG. 9 is an exemplary flowchart of an optical gradation method according to an embodiment of the present disclosure.

In accordance with another aspect of the present disclosure, corresponding to the embodiment of the optical gradation system, an optical gradation method is further disclosed. With reference to FIG. 9, the method includes steps of:

emitting, by a first device to a second device provided with at least one first region, broad-spectrum linearly polarized light in a first polarization direction;

splitting, by the first region of the second device without changing a beam propagation path, lights of different wavelengths mixed in the incident broad-spectrum linearly polarized light into emergent lights in different polarization directions;

filtering out, by a third device, linearly polarized light in a second polarization direction form the emergent lights from the second device in different polarization directions; and driving, by at least one rotator, at least one of the first device, the second device and the third device arranged coaxially to rotate.

It should be understood that, all the contents of the embodiments of the optical gradation system are also applicable to the embodiments of the method and have the same technical effects, so the description will not be repeated here.

The foregoing description merely shows the preferred embodiments of the present disclosure and is not intended to limit the present disclosure. Various alterations and variations may be made to the present disclosure by those skilled in the art. Any modifications, equivalent replacements and improvements made within the principle of the present disclosure shall fall into the protection scope of the present disclosure.

The invention claimed is:

1. An optical gradation system, comprising:
a first device configured to emit broad-spectrum linearly polarized light in a first polarization direction;
a second device provided with at least one first region for splitting lights of different wavelengths mixed in the broad-spectrum linearly polarized light incident by the first device into emergent lights in different polarization directions without changing a beam propagation path;
a third device configured to filter out linearly polarized light in a second polarization direction the emergent lights from the second device in different polarization directions; and
at least one rotator configured to drive at least one of the first device, the second device and the third device to rotate;
wherein the first device, the second device and the third device are arranged coaxially
wherein the second device is further provided with a second region that is not orientated, the first region is configured to set the projection content part and the second region is configured to transmit a projection background part.

2. The optical gradation system according to claim 1, wherein the first device is a polarizer or a broad-spectrum linearly polarized light source, the second device is a wave plate, and the third device is a linear polarizer.

3. The optical gradation system according to claim 2, wherein there are at least two first regions, the same first region has a same fast-axis orientation angle, and different first regions have different fast-axis orientation angles.

4. The optical gradation system according to claim 3, further comprising a mask arranged between the first device and the second device or between the second device and the third device, the mask comprising a light transmitting portion and a non-light-transmitting portion.

5. The optical gradation system according to claim 2, wherein the fast-axis orientation angle in the first region is set according to a preset pattern indicated by different gray scale values; and in the preset pattern, the fast-axis orientation angle corresponding to a pixel point having the maximum gray scale value is perpendicular to the fast-axis orientation angle corresponding to a pixel point having the minimum gray scale value.

6. The optical gradation system according to claim 5, wherein the fast-axis orientation angle in the first region is directly proportional to the gray scale value in the preset pattern.

7. The optical gradation system according to claim 5, wherein the first region comprises multiple portions, in each of which fast-axis orientation angles are the same and arranged randomly.

8. The optical gradation system according to claim 5, further comprising a mask arranged between the first device and the second device or between the second device and the third device, the mask comprising a light transmitting portion and a non-light-transmitting portion.

9. The optical gradation system according to claim 5, wherein the wave plate is further provided with a second region that is not orientated, the first region is configured to set a projection part and the second region is configured to transmit a projection background part.

10. An optical gradation method, comprising:
emitting, by a first device to a second device provided with at least one first region, broad-spectrum linearly polarized light in a first polarization direction;
splitting, by the first region of the second device without changing a beam propagation path, lights of different wavelengths mixed in the incident broad-spectrum linearly polarized light into emergent lights in different polarization directions;
filtering out, by a third device, linearly polarized light in a second polarization direction from the emergent lights from the second device in different polarization directions; and
driving, by at least one rotator, at least one of the first device, the second device and the third device arranged coaxially to rotate
wherein the second device is further provided with a second region that is not orientated, the first region is configured to set a projection content part and the second region is configured to transmit a projection background part.

11. The optical gradation method according to claim 10, wherein the first device is a polarizer or a broad-spectrum linearly polarized light source, the second device is a wave plate, and the third device is a linear polarizer.

12. The optical gradation method according to claim 11, wherein there are at least two first regions, the same first region has a same fast-axis orientation angle, and different first regions have different fast-axis orientation angles.

13. The optical gradation method according to claim 12, further comprising: providing a mask arranged between the first device and the second device or between the second device and the third device, the mask comprising a light transmitting portion and a non-light-transmitting portion.

14. The optical gradation method according to claim 12, wherein the fast-axis orientation angle in the first region is set according to a preset pattern indicated by different gray scale values; and in the preset pattern, the fast-axis orientation angle corresponding to a pixel point having the maximum gray scale value is perpendicular to the fast-axis orientation angle corresponding to a pixel point having the minimum gray scale value.

15. The optical gradation method according to claim 14, wherein the fast-axis orientation angle in the first region is directly proportional to the gray scale value in the preset pattern.

16. The optical gradation method according to claim 14, wherein the first region comprises multiple portions, in each of which fast-axis orientation angles are the same and arranged randomly.

17. The optical gradation method according to claim 14, further comprising: providing a mask arranged between the first device and the second device or between the second device and the third device, the mask comprising a light transmitting portion and a non-light-transmitting portion.

18. The optical gradation method according to claim 14, wherein the wave plate is further provided with a second region that is not orientated, the first region is configured to set a projection content part and the second region is configured to transmit a projection background part.

* * * * *